(12) United States Patent
Gadot et al.

(10) Patent No.: US 7,263,726 B2
(45) Date of Patent: Sep. 4, 2007

(54) JACKET SUITABLE FOR MACHINE WASHING AND TUMBLE DRYING

(76) Inventors: Moshe Gadot, 1 Paldi Street, Rehovot (IL); John Shaw Newton, 31 Gloucester Ave, London (GB) NWI 7AU; Avraham Einhorn, 10/3 Hachermon Street, Kiryat Gat (IL); Raymond Archibald Walters, Nightingale Corner, Nightingale Road, Herts (GB) ND233NJ; Lia Sherban, 22 Shenef Street, Yavneh (IL) 96222; Hanna Shoshana, 24 Mevo Livna Street, Kiryat Gat (IL) 82076

( * ) Notice: Subject to any disclaimer, the term of this patent is extended or adjusted under 35 U.S.C. 154(b) by 0 days.

(21) Appl. No.: 11/038,244

(22) Filed: Jan. 21, 2005

(65) Prior Publication Data

US 2005/0278824 A1    Dec. 22, 2005

Related U.S. Application Data

(63) Continuation-in-part of application No. 10/916,441, filed on Aug. 12, 2004, which is a continuation of application No. 10/125,419, filed on Apr. 19, 2002, now abandoned.

(51) Int. Cl.
*A41D 27/24* (2006.01)
*A41D 27/02* (2006.01)
*A41D 27/06* (2006.01)

(52) U.S. Cl. ............... 2/108; 2/97; 2/272; 2/243.1; 2/275; 2/274

(58) Field of Classification Search .......... 2/97, 2/272, 243.1, 274, 275, 85, 93, 108; 112/440, 112/424; 156/93, 90, 91, 85
See application file for complete search history.

(56) References Cited

U.S. PATENT DOCUMENTS 1,573,302 A    2/1926    Cohen
2,571,890 A *  10/1951   Kagan et al. ............... 2/268

(Continued)

FOREIGN PATENT DOCUMENTS

EP           0 894 442        2/1999

(Continued)

OTHER PUBLICATIONS

European Search Report for EP 05 00 1150 dated Jun. 27, 2005.

(Continued)

*Primary Examiner*—Gloria M. Hale
(74) *Attorney, Agent, or Firm*—Pearl Cohen Zedek; Latzer LLP

(57) ABSTRACT

The invention relates to a tumble dryable item of apparel, in particular a suit jacket, comprising a plurality of inner surface and outer surface garment sections, wherein at least one of the outer surface garment sections includes natural fiber and at least one of the inner surface garment sections includes synthetic fiber and has shape memory, and at least one synthetic interface tape between an inner surface garment section and an outer surface garment sections, wherein the synthetic interface tape is fixed on a location of the jacket such that the jacket substantially retains its shape through a tumble dry cycle.

3 Claims, 10 Drawing Sheets

U.S. PATENT DOCUMENTS

| | | |
|---|---|---|
| 3,446,658 A | 5/1969 | Rose |
| 3,639,914 A * | 2/1972 | Ellman ............................ 2/93 |
| 3,703,730 A | 11/1972 | Miller |
| 3,769,819 A | 11/1973 | Contreras |
| 4,141,082 A | 2/1979 | Nakazawa et al. |
| 4,143,424 A | 3/1979 | Knoke et al. |
| 4,214,319 A | 7/1980 | Bollag |
| 4,490,425 A | 12/1984 | Knoke et al. |
| 4,521,921 A | 6/1985 | Bregatta |
| 5,044,013 A | 9/1991 | Ackerman |
| 5,526,534 A | 6/1996 | Lazar et al. |
| 5,669,072 A | 9/1997 | Bjorklund |

FOREIGN PATENT DOCUMENTS

| | | |
|---|---|---|
| EP | 1 232 697 | 8/2002 |
| FR | 2 763 799 | 12/1998 |
| GB | 2 401 302 | 11/2004 |

OTHER PUBLICATIONS

International Search Report—International Application No. PCT/IL05/00682 Date of Malling Mar. 24, 2006.
Office Action dated Jun. 30, 2005. U.S. Appl. No. 10/916,441.
Office Action dated Nov. 23, 2006. U.S. Appl. No. 10/916,441.

* cited by examiner

JACKET SUITABLE FOR MACHINE WASHING AND TUMBLE DRYING

CROSS-REFERENCE TO RELATED APPLICATIONS

The present application is a continuation-in-part application of U.S. Ser. No. 10/916,441, filed Aug. 12, 2004, which is a continuation application of U.S. Ser. No. 10/125,419, filed Apr. 19, 2002, now abandoned, both applications are hereby incorporated by reference in their entirety.

FIELD OF THE INVENTION

The invention relates to an item of apparel, such as a jacket, in particular a man's jacket or suit jacket.

BACKGROUND OF THE INVENTION

Men's suits whilst still being bespoke tailored, are increasingly made by mass production techniques. Such techniques lend such suits to be sold relatively inexpensively in retail outlets such as department stores. However, suits have to be cleaned. Cleaning, particularly dry cleaning is relatively expensive, and has to be repeated several times over the life of the suit, so increasing its overall cost.

Various proposals have been made for making machine-washable and dryable suits but such known suits were not able to retain their shape or smartness after being subjected to a number of wash and dry cycles.

It is an object of the invention to provide a machine-washable and dryable item of apparel, which is able to retain its shape or smartness after being subjected to machine washing and machine drying.

SUMMARY OF THE INVENTION

The present invention concerns a machine-washable and dryable item of apparel comprising a plurality of garment sections of a first, outer material, said first, outer material being a machine-washable and dryable fabric having a crease memory, said garment sections being joined to each other by sewn seams using machine-washable and dryable thread; a plurality of sections of a second, interfacing material, said second interfacing material being a machine-washable and dryable, fusible interfacing material, said sections of said second, interfacing material being secured to the inner side of selected ones of said garment sections by heat fusing thereto; and a plurality of sections of a third, lining material, said third, lining material being a machine-washable and dryable lining material, said lining sections being processed by an anti-static finish process to prevent static electricity during a dry cycle, and being joined to each other by sewn seams using machine-washable and dryable thread, and said joined lining sections being secured on the inner side of said joined garment sections.

According to various embodiments of the present invention, the first, outer material being a machine-washable and dryable fabric may be processed by an anti-static finish process to prevent static electricity during a dry cycle.

According to various embodiments of the present invention, various features can be used singly or in combination to achieve very superior results on machine washing and drying.

According to a first aspect of the invention, there is provided an item of apparel, such as a suit jacket, comprising a fabric which is washable and has a crease memory whereby on washing and drying, the item of apparel is not substantially creased.

The item of apparel may comprise styling inserts between the fabric and the lining of the item of apparel, and adhesive(s) and thread(s) used in construction of the item of apparel, which are machine-washable and dryable.

Thus on washing and drying, the shape of the item may be maintained.

Edges of the styling inserts may be over-locked to obviate fraying. In particular, edges of machine-washable and dryable canvas chest and sleeve inserts may be over-locked. Furthermore, edges of the styling inserts, for example, of the canvas chest may be tailored without an inner ribbon, to obviate fraying.

The edges of the lining material may be over-locked to obviate fraying. This feature, as with chest and sleeve inserts, may assist in maintaining the original styling and hence shape of the item after a wash and a dry cycle.

There may be at least one pocket, a bag of which may be secured to an adjacent seam to obviate creasing during washing or drying. This may avoid unsightly creasing in the wash or in the dry, particularly when the bag may be a breast pocket bag secured to a facing seam by sewing.

There may be two pockets which may comprise front pockets each bag of which may be secured to a side seam by a tape sewn into that side seam.

Facings of the item may be stitched to fronts by a blind stitch, to obviate creasing during washing and drying. The blind stitch may avoid puckering.

Long seams may be secured with fused tapes to obviate puckering after a wash or a dry cycle. The fused tapes may comprise an adhesive which may have a peel strength of about 20 N/5 cm.

The adhesive melt temperature may be in the range 130° C.-140° C., particularly about 135° C. This feature may provide a secure fixing whilst obviating puckering and creasing in a wash and dry cycle.

The fabric may comprise a natural fiber, e.g., wool, and synthetic fabric mixture, for example, a wool and polyester mixture, such as 50% or more polyester, particularly a polyester/wool/lycra mixture, preferably comprising 55% polyester, 43% wool and 2% lycra. This may provide a suitable machine-washable and dryable, non-creasing item of apparel, which may suitably be a man's jacket.

According to another aspect of the invention, there is provided a combination comprising an item of apparel, as hereinbefore defined, and a wash bag into which the item is placed for washing.

The wash bag may have a central closable opening through which the item is inserted. Thus, when so inserted and laid flat in the bag, the item of apparel may be maintained substantially flat during washing, and this, with the features hereinbefore described, may help to obviate creasing during washing.

Thus, using the invention it is possible to wash and dry say a man's suit including the jacket, in a washing machine and in a drying machine, respectively. According to some embodiments of the present invention, there is provided a tumble dryable suit jacket having a plurality of inner surface and outer surface garment sections. At least one of the sections is a natural fiber and synthetic fiber blend, and at least one of the sections has a shape memory. At least one synthetic interface tape may be between an inner surface garment segment and an outer surface garment sections, wherein the synthetic interface tape may be fixed on a location of the jacket such that the jacket substantially retains its shape through a tumble dry cycle.

According to some embodiments of the present invention, the outer surface garment sections may be comprised of a material which is a tumble dryable fabric having a crease memory, and the outer garment sections may be joined to each other by sewn seams using machine-washable and dryable thread.

According to some embodiments of the present invention, a plurality of inner surface garment sections may be comprised of a lining material, wherein said lining material is a tumble dryable lining material.

According to some embodiments of the present invention, garment sections composed of a lining material may be joined to each other by sewn seams using machine-washable and dryable thread.

According to some embodiments of the present invention, garment sections composed of lining material may be processed by an anti-static finish process to prevent static electricity during a dry cycle.

According to some embodiments of the present invention, the jacket may include a plurality of styling inserts selected from one or more of the group consisting of machine washable and dryable shoulder pads, chest trim and sleeve trim, wherein said styling inserts may be made from made of tumble dryable material and the edges of said styling inserts may be over-locked with machine-washable thread to obviate fraying.

According to some embodiments of the present invention, the edges of the styling inserts may be set without an inner tape to avoid puckering.

According to some embodiments of the present invention, the outer surface garment sections may be comprised of a natural fiber, e.g., wool, and synthetic fabric mixture and the interfacing material and lining material may be comprised of a 100% synthetic material.

According to some embodiments of the present invention, the outer surface garment sections may be processed by an anti-static finish process to prevent static electricity during a drying cycle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 10 and 10A show respectively an elevation and a plan view of a washing bag and a bag in which the washing bag is stowed.

Figure 1A:
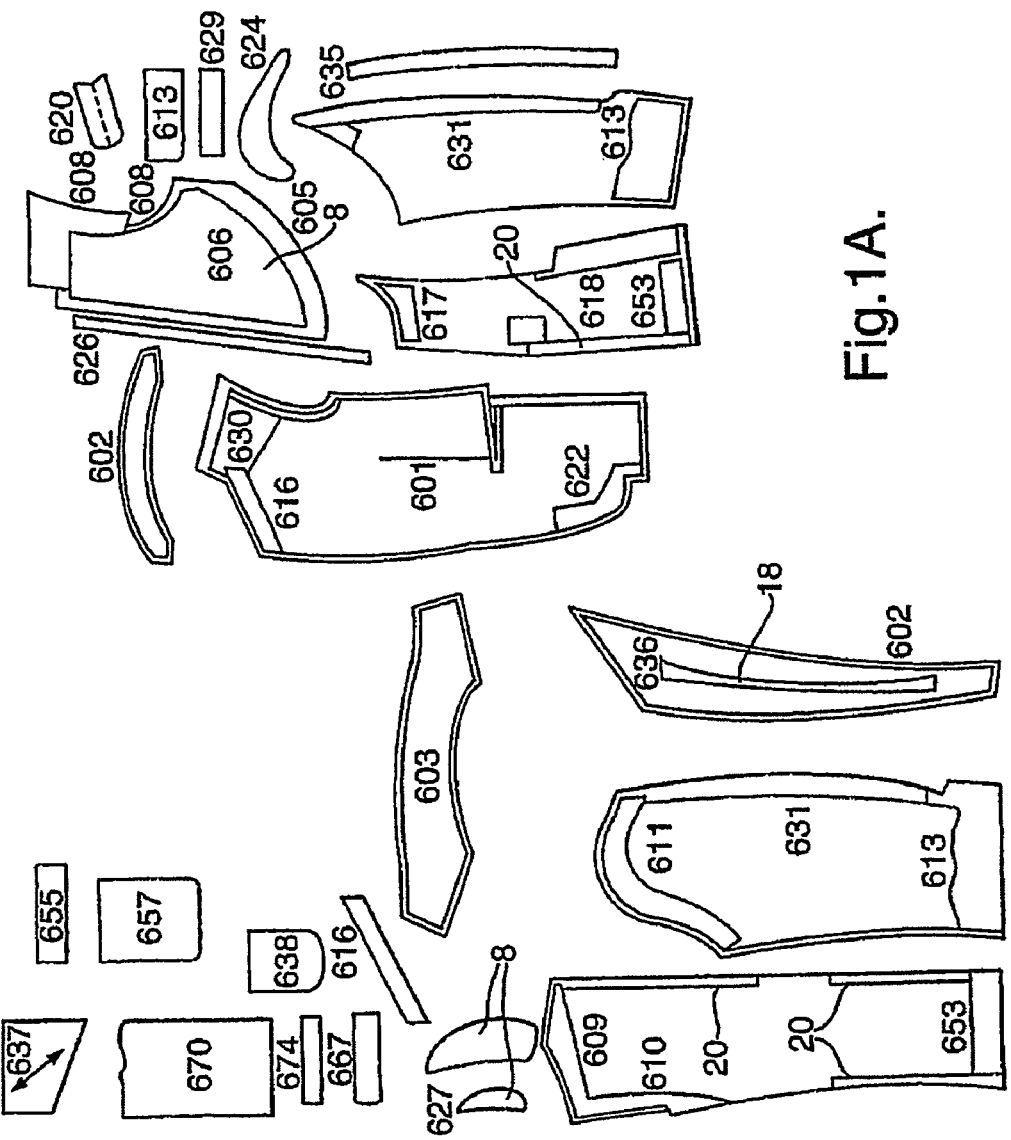
FIG. 1A shows schematically elevations of style inserts or trim, used in the manufacture of the suit jacket of FIG. 1.
Figure 1:
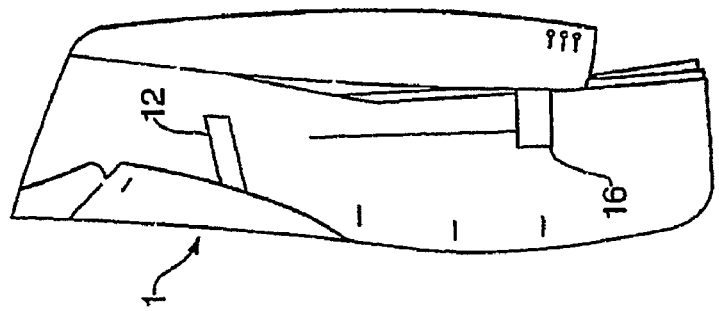
FIG. 1 is a side view of a jacket according to the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

Referring to the drawings, there is shown an item of apparel, in the embodiment a man's jacket 1 of a man's suit, comprising a fabric which may be machine-washable and machine-dryable and may have a crease memory whereby on washing and/or on drying, the jacket 1 may not be substantially creased.

The jacket 1 may be machine-washable and machine dryable and may comprise a plurality of garment sections of a first, outer material. The said first, outer fabric may be a machine-washable and dryable fabric having a crease memory. The fabric may have a crease memory in the sense that desired creases may be retained whereas smooth, non-creased areas may remain smooth and non-creased. The crease memory may be achieved by the inclusion of synthetic material, for example polyester, at least 50% polyester, in the material of the outer fabric. The said garment sections may be joined to each other by sewn seams using commercially-available machine-washable and machine dryable thread.

The general cutting out and sewing together of the garment sections may follow conventional garment construction practice and does not therefore need to be described in further detail.

The jacket 1 may also include a plurality of sections of a second, interfacing material. The interfacing material may be a machine-washable and machine dryable, fusible interfacing material, for example, a synthetic material coated on one side with a heat-fusible adhesive. A suitable material may be, for example, a 100% polyester material of weight 85 gm/m2 with elastic warp and elastic weft coated with fine microdots of fusible adhesive. The sections of said second, interfacing material may be secured to the inner side of selected ones of said garment sections by heat fusing thereto.

The jacket may also include a plurality of sections of a third, lining material. The third, lining material may be a machine-washable and dryable lining material, for example, a 100% polyester material. The said lining sections may be processed by an anti-static finish process. The said lining sections may be joined to each other by sewn seams using machine-washable and dryable thread. The said joined lining sections may be secured on the inner side (that is the interior or wearer's body side) of said joined garment sections.

According to the invention, a number of measures may be taken to increase the crease memory of the jacket to make it able to retain a smart appearance after machine washing and machine drying.

Figure 2:
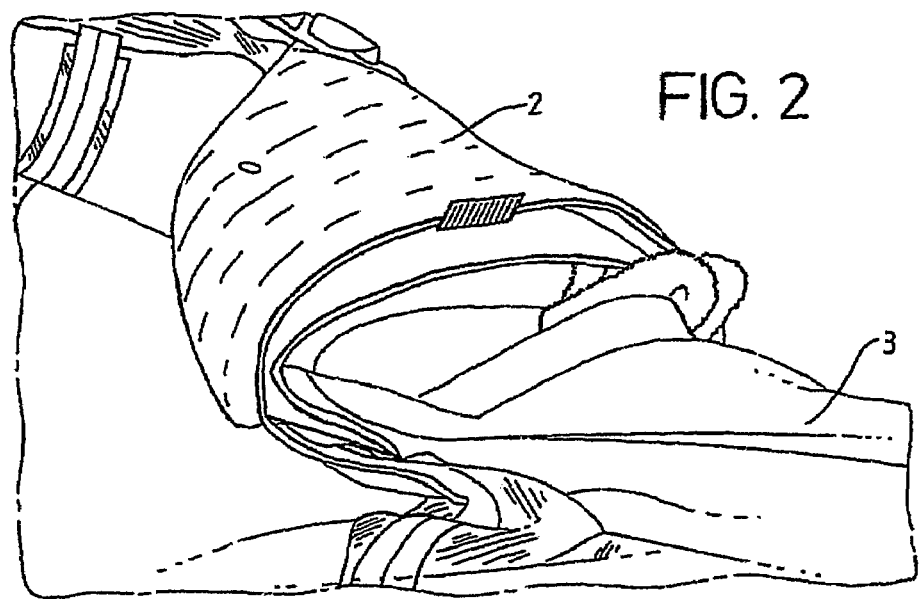
FIGS. 2 and 2A show schematically different perspective views, to a larger scale than FIGS. 1 and 1A, of style inserts in the form of machine-washable and dryable shoulder pads of the jacket.
Figure 2A:
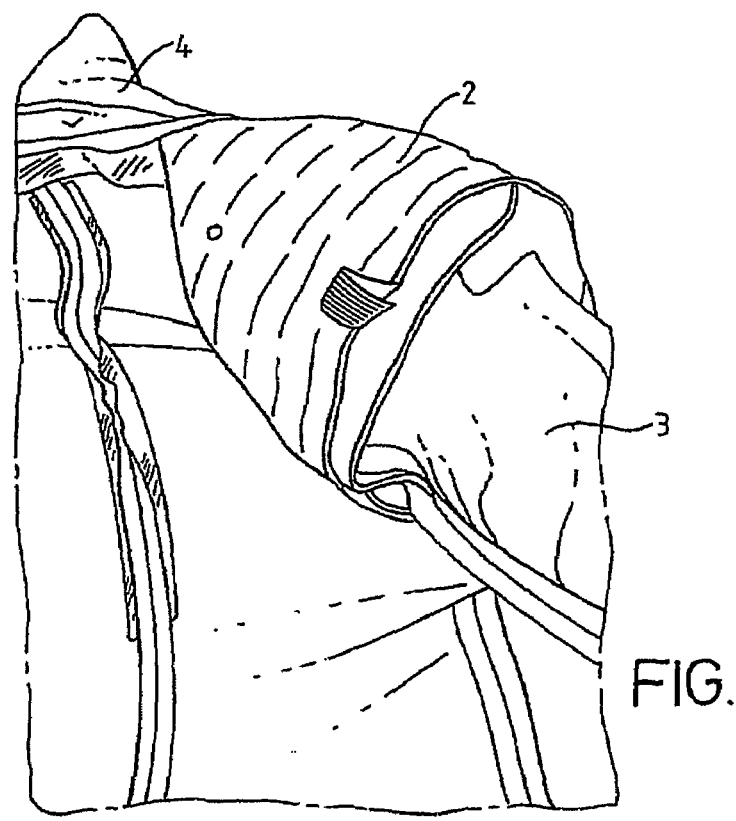

According to one aspect of the invention, the crease memory may be enhanced by the styling inserts or trim between the lining of the jacket, and the adhesive(s) and the machine-washable and machine-dryable thread(s) used in construction of the jacket Thus FIGS. 2 and 2A show washable and dryable shoulder pads 2 which are inserted between the lining 4 and the fabric 3. Another example of a suitable outer fabric 3 for the jacket 1 is a mixture of polyester, natural fiber, e.g., wool, and lycra in the proportions 55%, 43% and 2%.

Figure 3:
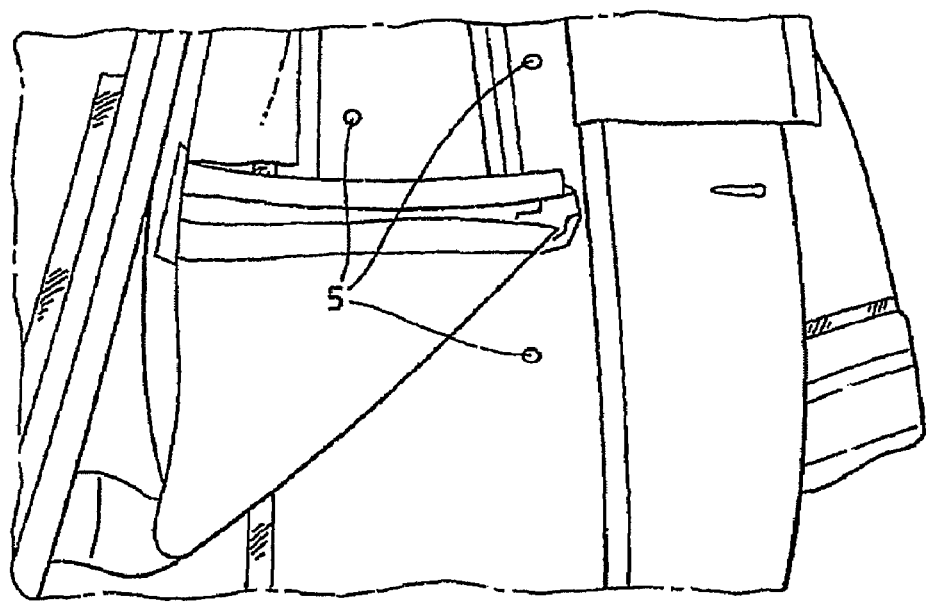
FIG. 3 shows schematically machine-washable and dryable fusible materials of the jacket of FIGS. 1 and 1A. and to a larger scale than those figures.
Figure 3:
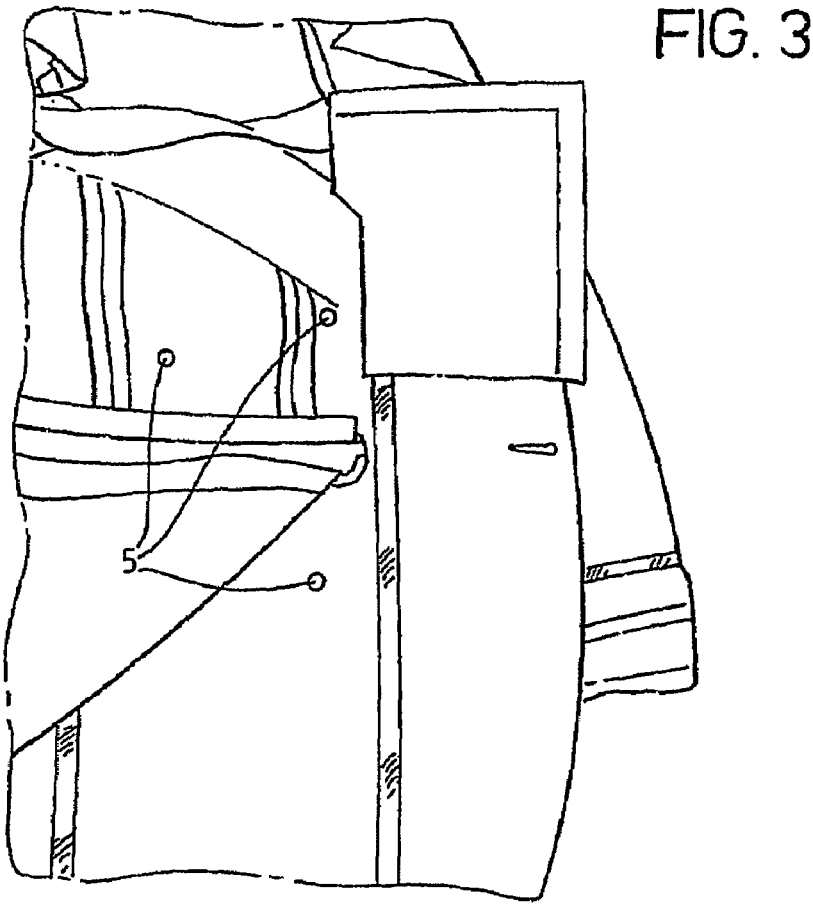
Figure 4:
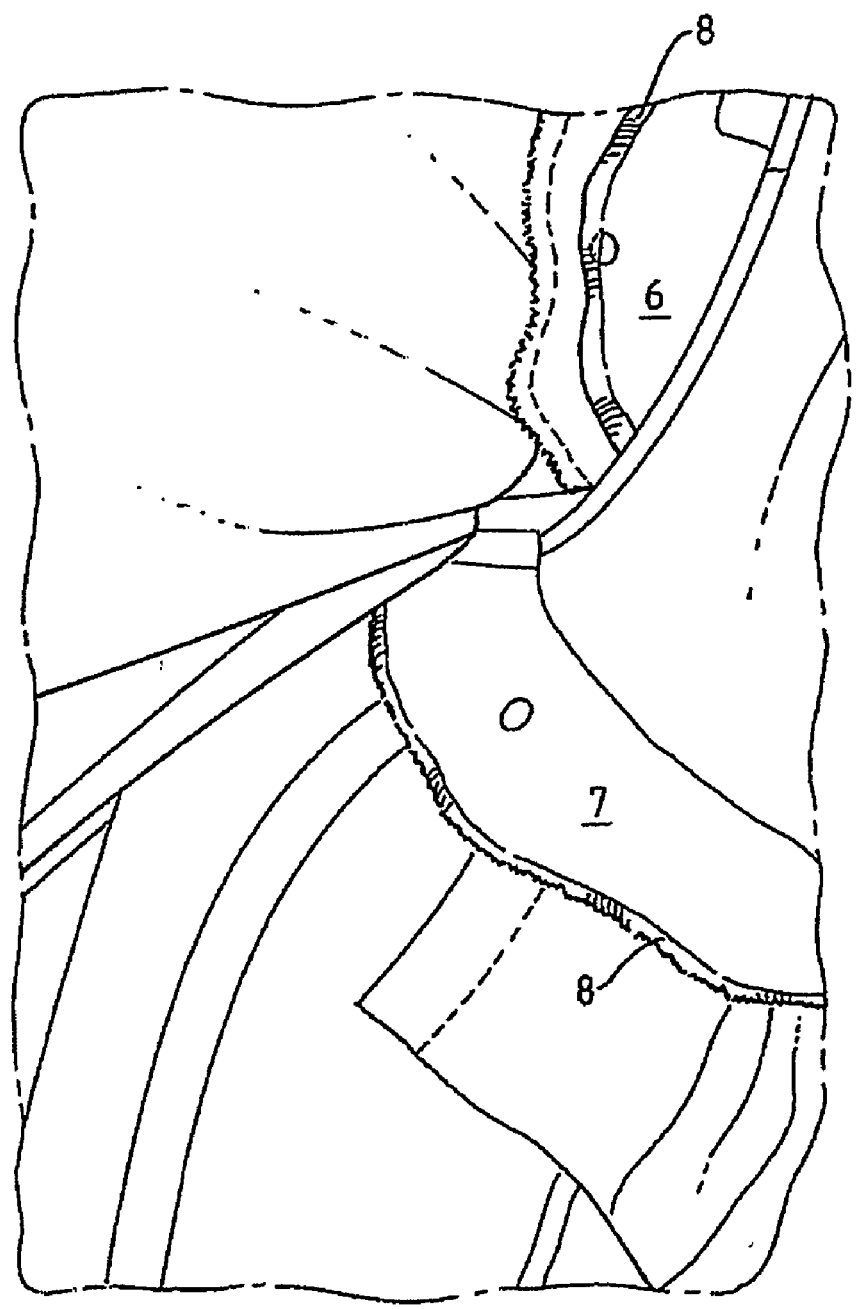
FIG. 4 shows schematically chest and sleeve style inserts in the form of machine-washable and dryable canvas trim of the suit of FIG. 1, and locked over edges of the canvas to avoid fraying.

FIG. 3 shows machine-washable and machine dryable fusible or fusing materials 5 while FIG. 4 shows style inserts in the form of chest and sleeve trim 6, 7 made, in the embodiment, of machine-washable and machine dryable canvas, the edges of which may be secured against fraying by over-locked stitches 8 in the embodiment.

Figure 5:
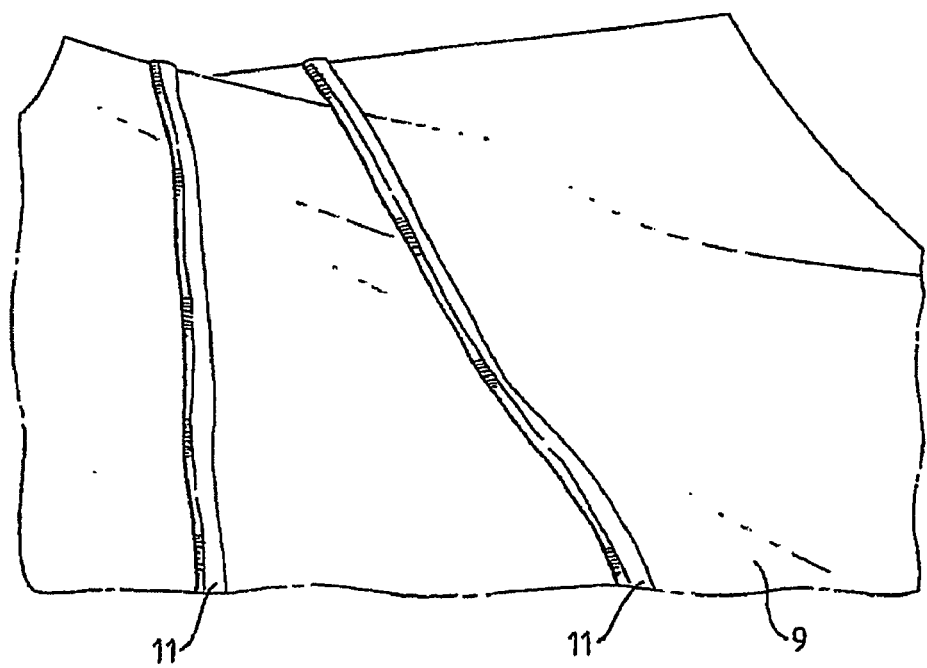
FIG. 5 shows schematically two parts or sections of lining of the suit, the edges of which are locked over to obviate fraying.
Figure 5:
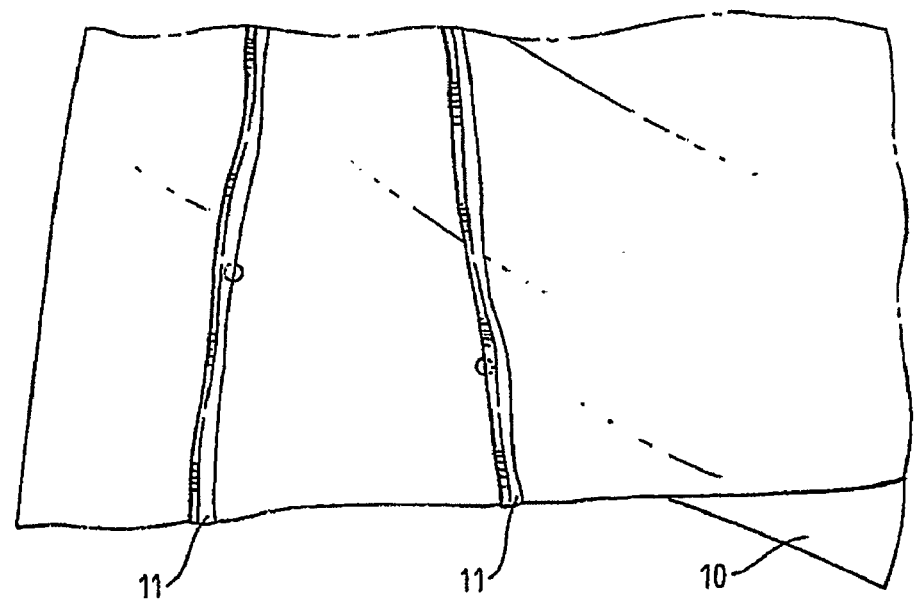

FIG. 5 shows different parts or sections 9, 10 of the lining of the jacket, the edges of which are also secured against fraying by over-locked stitches 11 in the embodiment. In accordance with some embodiments of the present invention, edges of the styling inserts, for example, of the canvas chest may be set without an inner tape, to avoid puckering.

Figure 6:
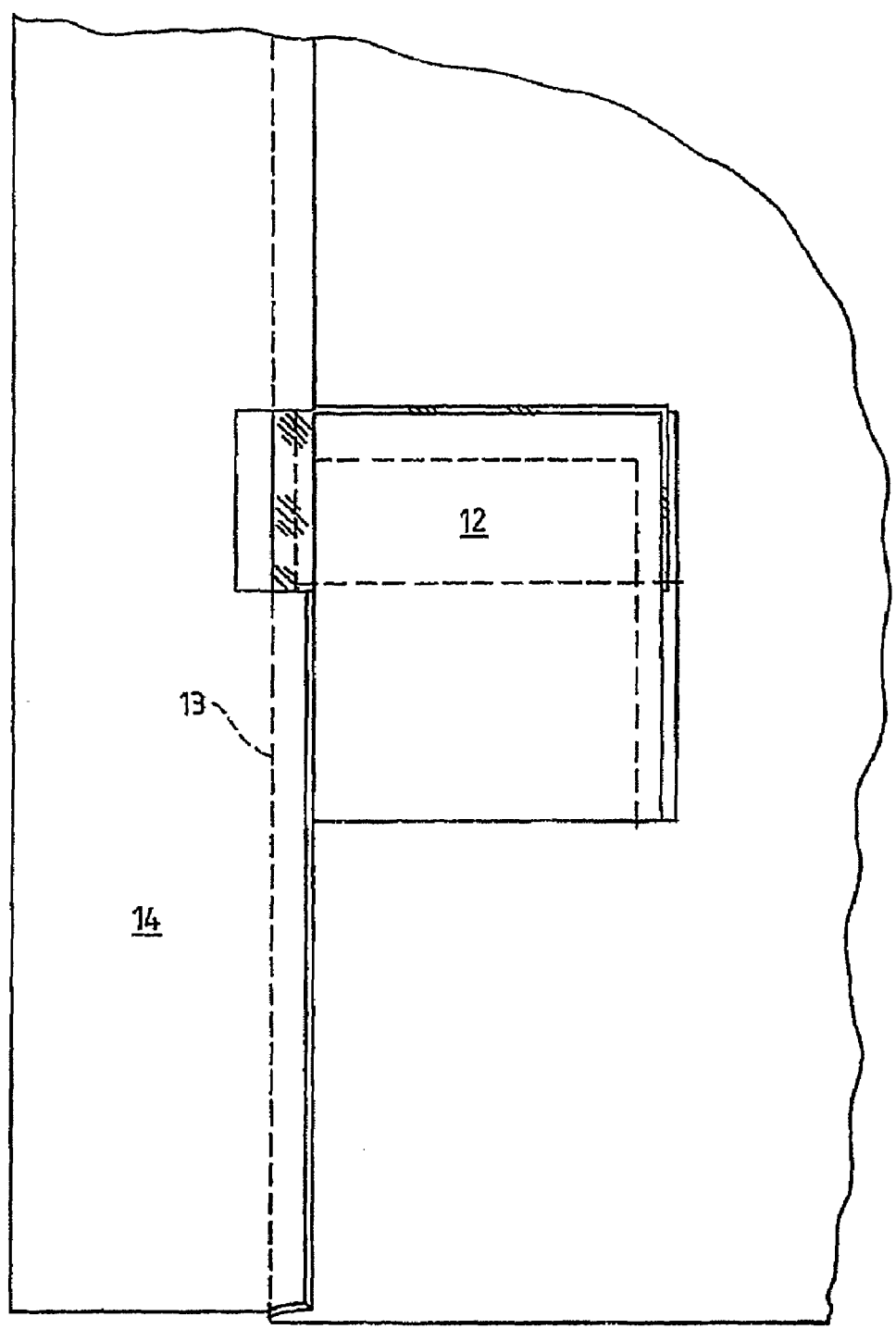
FIG. 6 shows schematically in elevation a chest or in breast pocket bag sewn into a facing seam to obviate creasing during a wash or a dry.
Figure 7:
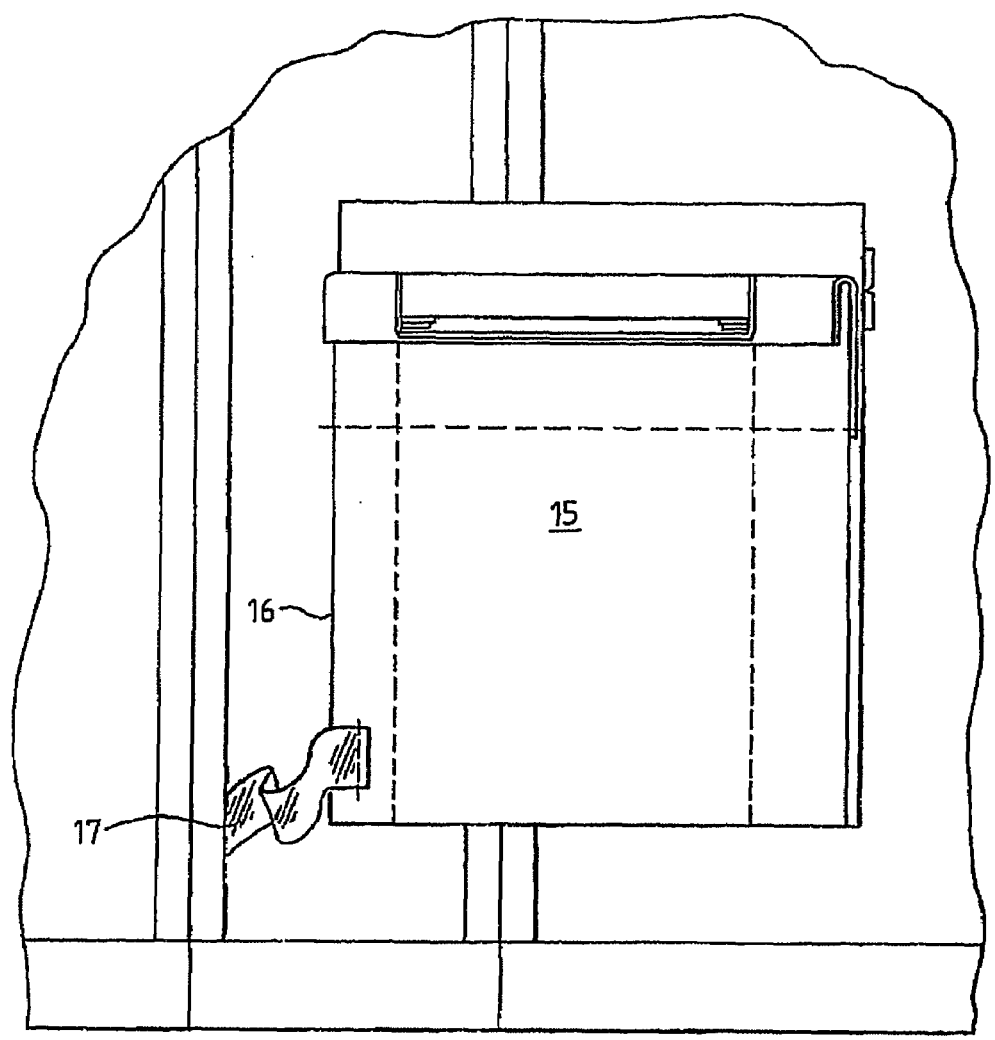
FIG. 7 shows schematically in elevation, front pocket bags secured with tapes sewn into the side seams in order to avoid creasing during a wash or a dry.

Turning now to FIG. 6, a chest or breast pocket 12 of the suit jacket 1 may have an inner bag 12 defining the pocket and which may be sewn into a seam 13 of the facing 14 in order to obviate creasing during a wash and/or a dry. As seen in the drawings, the mouth of the pocket 12 may run transverse to the length of the jacket and the seam 13 may run along the length of the jacket. In a similar manner, the lower ends of bags 15 of front pockets 16 may be secured with a tape 17 sewn into the side seam in order to avoid creasing during a wash and/or a dry (FIG. 7). The tape(s) 17 may hold the side pocket bags 15 in place and may be long enough to allow for movement, so avoiding creasing. One or more so-called "inside pockets" where the mouth of the pockets opens to the exterior surface of the lining (the inside of the jacket) may be provided in a similar manner.

Figure 8:
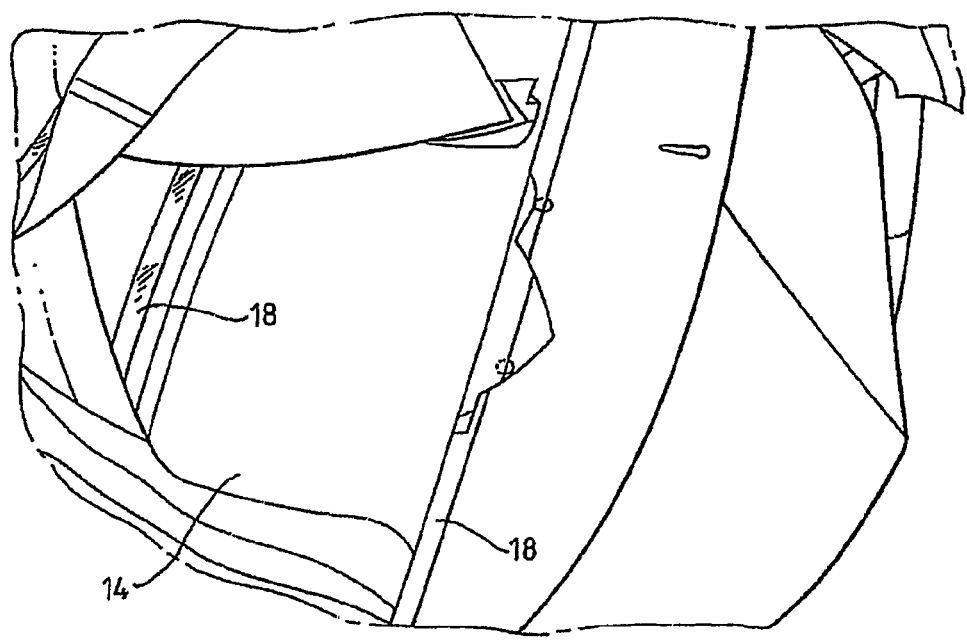
FIG. 8 shows schematically in elevation style inserts in the form of facings secured to fronts by blind stitches.
Figure 9:
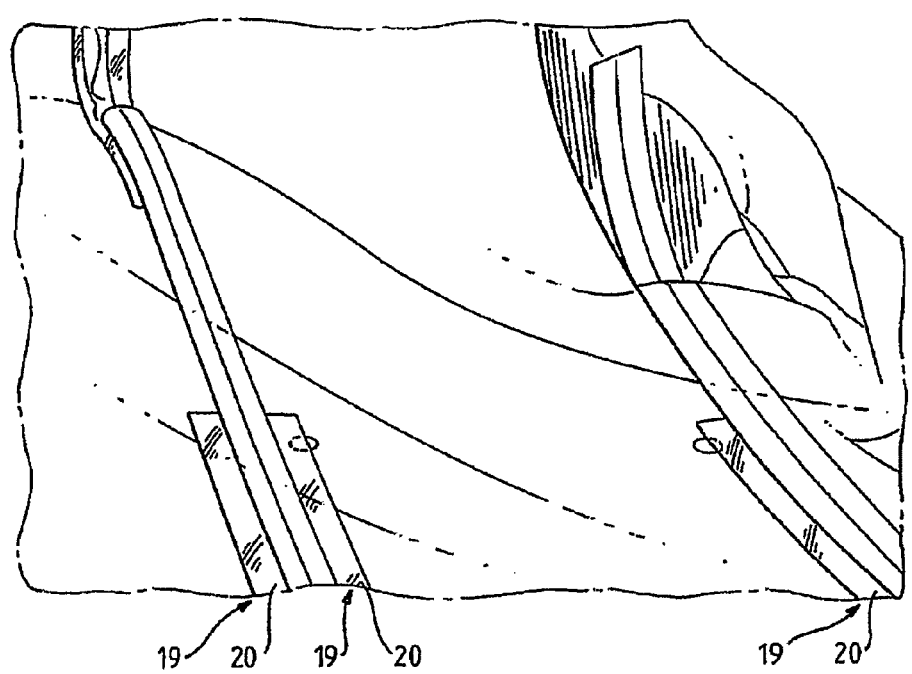
FIG. 9 shows schematically long seams secured with fused tapes to obviate puckering after a wash or a dry.

Turning now to FIG. 8, there are shown style inserts in the form of facings 14 secured by stitching to the fronts using blind stitches 18, while FIG. 9 shows long seams 19 secured with machine-washable and machine dryable fused tapes 20 to obviate puckering after a wash and/or a dry.

Figure 10:
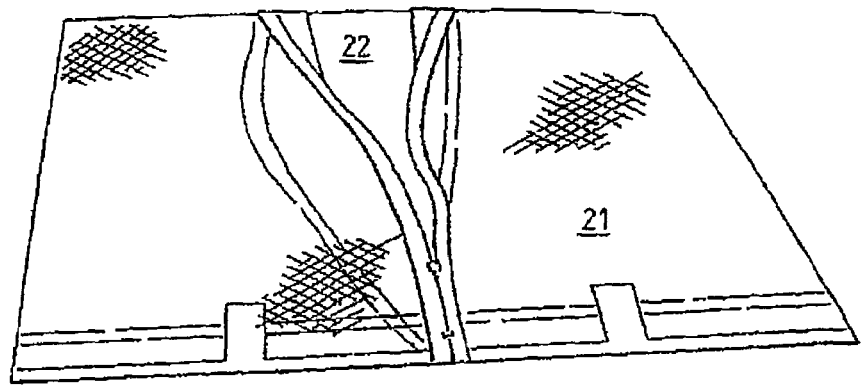
Figure 10:
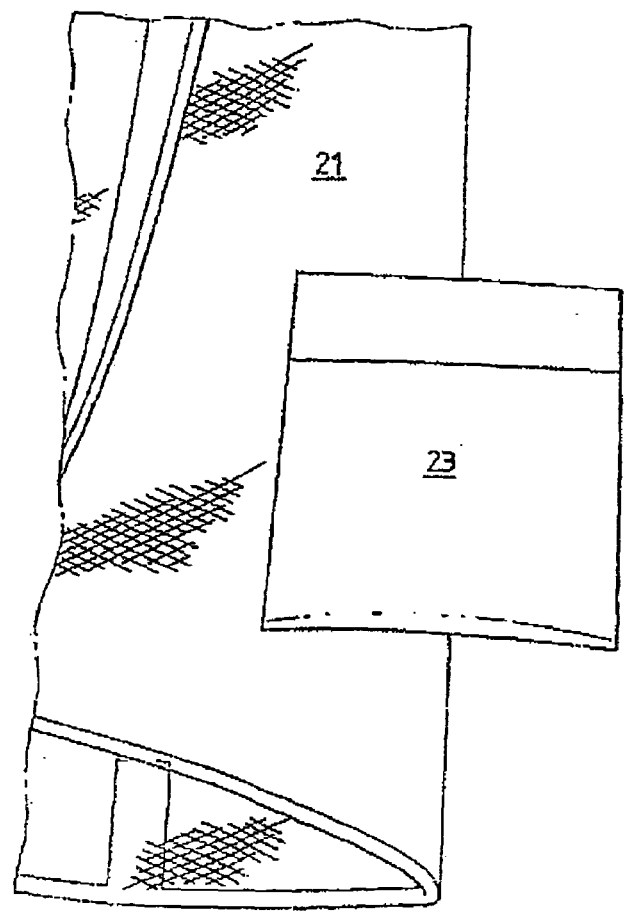

FIG. 10 shows a bag 21 made of synthetic material readily permeable to washing water. The bag 21 is of sufficient size for the item of apparel to be stowed and laid flat on it, prior to closing as by zipping up a central opening 22 through which the apparel is inserted, the bag 21 being closed which maintains the item flat so that it can be placed in a washing machine and subjected to a wash cycle, whereafter the suit emerges relatively uncreased and/or smooth, the bag 21 being a mesh bag to allow for full circulation of washing medium. The bag 21 is housed when not in use in a bag 23.

During manufacture of the suit jacket 1, fusing machines used to fuse the adhesive may be set to provide a desired peel strength, which in the embodiment may be, for example, no less than 20N/5 cm. The adhesive/glue temperature may be 135° C. in the embodiment. Also, after manufacture, the suit jacket 1 may be pressed for a period of time which adds relaxation and vacuum time in order to achieve a substantially flat press of the jacket, in which shoulder reinforcements may be inclined at an angle of 15°.

Reverting to FIG. 1A, details of styling inserts and fusible components used in the construction of the jacket 1 are identified in the following list by reference numerals starting at 601:

601 fusible interfacing section for jacket front of jacket
602 lapel and "banana" insert
615 fusible interfacing section for pocket flap
629 fusible interfacing for pocket jet
603 insert for the collar
609 insert for the shoulder
611 insert for the top upper of a sleeve
617 side part for the arm pit
618 fusible interfacing for the jacket vent
610 back part for the arm pit
605 chest piece of machine-washable canvas
606 fusible interfacing for the jacket chest
608 reinforcing section for the chest of the jacket
613 fusible interfacing for sleeve of the jacket
636 reinforcing section for use in the lapel of a double-breasted jacket
616 upper marking fusible interfacing
635 reinforcing section for back length of jacket
620 chest pocket
674 pockets (no fusing) of flieselin (non woven)
624 helzaflex (vatellina)
653 hem
657 flieselin (non woven) for patch pocket
655 reinforcing section for patch pocket reinforcement
670 flieselin (non woven) for side part
667 fusible interfacing for front darts
627 ambassador (machine-washable sleeve canvas)
638 chest pocket
631 fusible interfacing for back of sleeve
622 lower marking fusible interfacing
630 shoulder reinforcement 15°
626 chest piece tape 20 mm Although a detailed description of a jacket according to the invention has been given, the invention may also be supplied to a different item of apparel, for example, a pair of trousers, in particular, a matching pair of trousers for the described suit jacket.

What is claimed is:

1. A jacket comprising:
   a plurality of sections of an inner material of said jacket and a plurality of sections of an outer material of said jacket, wherein at least one of the sections of said outer material includes natural fiber and synthetic fibers to retain a crease after tumble drying, and at least one of the sections of said inner material includes synthetic fiber;
   a plurality of styling inserts selected from the group consisting of canvas chest trim and sleeve trim, wherein said styling inserts are made of machine-washable material, and the edges of said styling inserts are set without an inner tape; and
   at least one synthetic interface tape on a seam of one of said sections of outer material, wherein the synthetic interface tape is to avoid puckering of said seam in a tumble dry cycle.

2. The jacket according to claim 1, wherein said sections of outer material are comprised of a wool and synthetic fabric mixture and said plurality of sections of inner material are comprised of a 100% synthetic material.

3. The jacket according to claim 1, wherein said plurality of sections of outer material are comprised of an anti-static finish material to prevent static electricity during a dry cycle.

* * * * *